United States Patent [19]
Lehmann

[11] 3,893,221
[45] July 8, 1975

[54] LENS ASSEMBLY MOUNTING METHOD AND APPARATUS

[75] Inventor: Walter G. Lehmann, Somerville, Mass.

[73] Assignee: Polaroid Corporation, Cambridge, Mass.

[22] Filed: Dec. 26, 1973

[21] Appl. No.: 427,582

[52] U.S. Cl. .............. 29/453; 29/526; 151/41.75; 354/286
[51] Int. Cl. ............................................ B23p 11/02
[58] Field of Search ...... 29/453, 526; 285/260, 423, 285/DIG. 19, DIG. 22; 292/256.6, 256.63, 299, 319, DIG. 61; 354/286, 288, 354; 24/217 R, 249 SL, 256, 257 A; 151/41.7 S, 49; 277/11; 339/61, 217 S, 128, 74 R; 403/179, 203, 202, 225, 226, 257, 261, 243, 292, 341, 366, 367, 368, 405

[56] References Cited
UNITED STATES PATENTS

| | | | |
|---|---|---|---|
| 2,620,539 | 12/1952 | Poupitch | 29/526 X |
| 2,643,581 | 6/1953 | Wehrenfennig | 354/286 |
| 2,880,641 | 4/1959 | Sislik | 29/453 UX |
| 2,884,283 | 4/1959 | Korol et al. | 29/453 UX |
| 2,941,270 | 6/1960 | Long | 292/319 X |
| 3,197,169 | 7/1965 | Burrows | 24/256 X |
| 3,219,087 | 11/1965 | Zahodiakin | 151/41.75 |
| 3,232,088 | 1/1966 | Newcomer et al. | 29/453 UX |
| 3,236,528 | 2/1966 | Bram | 29/453 UX |
| 3,241,874 | 3/1966 | Russell et al. | 29/526 UX |
| 3,312,483 | 4/1967 | Leadbetter et al. | 285/423 X |
| 3,388,647 | 6/1968 | Yajima | 354/286 |

*Primary Examiner*—C. W. Lanham
*Assistant Examiner*—Joseph A. Walkowski
*Attorney, Agent, or Firm*—Michael Bard; John W. Ericson

[57] ABSTRACT

A lens mounting and securing apparatus in the form of a resilient retaining ring fits over a portion of a lens housing to secure the lens assembly to the shutter housing of a photographic camera. The resilient retaining ring is configured with a plurality of inwardly extending tab members which allow a portion of the lens housing to pass through the retaining ring in one direction while preventing any movement in the opposite direction to thereby fixedly secure the lens housing to the shutter housing. Additionally, the retaining ring is provided with a plurality of tab members for proper positioning of the retaining ring.

10 Claims, 4 Drawing Figures

PATENTED JUL 8 1975     3,893,221

SHEET 1

LENS ASSEMBLY MOUNTING METHOD AND APPARATUS

BACKGROUND OF THE INVENTION

Photographic developments in recent years have included the advent of sophisticated yet inexpensive photographic cameras such as the Land-type cameras manufactured by Polaroid Corporation in Cambridge, Mass.

In order to achieve the desired goal of providing a precision optical instrument at minimum cost, such cameras are frequently constructed largely of plastic and many even include multi-component plastic lens assemblies. In the manufacture of such cameras, the lens housing is typically secured to the shutter housing assembly of the camera. Obviously, the positioning of the lens housing and its associated optical components must be quite precise in order to achieve satisfactory photographic performance and, hence, the fastening of the lens housing must be quite precise and represents a critical stage in the manufacture of such cameras.

Various apparatus and techniques have been proposed for use in effecting the precision attachment of the lens housing to the shutter assembly housing in the past including the use of adhesives, the use of mating threaded male and female connecting portions, and the use of sonic welding techniques. In keeping with the desire to minimize the cost of the camera while retaining optical precision, manufacturing simplicity and safety from inadvertent degradation of the lens elements themselves, or their positioning, becomes paramount.

SUMMARY OF THE INVENTION

The subject invention provides a precise, simple, and effective mechanism for securing an objective lens assembly to the shutter housing of a photographic camera.

Basically, the objective lens assembly is provided with a plastic housing having a cylindrical portion of reduced diameter which extends rearwardly along the optical axis of the objective lens assembly. The shutter housing assembly is provided with a forward wall having a circular aperture therein of a size to receive the reduced diameter cylindrical portion of the objective lens assembly housing. The reduced diameter portion of the objective lens assembly housing extends beyond the front wall of the shutter housing assembly an amount sufficient to receive a resilient retaining ring which is configured to pass over the reduced diameter portion of the objective lens assembly housing in only one direction whereby the resilient retaining ring may be pressed onto said reduced diameter portion of the objective lens assembly housing until it abuts the rear face of the front wall of the shutter assembly housing, thereby tightly securing the objective lens assembly to the shutter assembly housing.

The resilient retaining ring is generally planar and includes a plurality of inwardly extending short tabs which extend to define an opening of a diameter slightly greater than the diameter of the portion of the objective lens assembly housing extending through the front wall of the shutter assembly housing, whereby the resilient retaining ring may be properly located with respect to the objective lens assembly housing prior to being secured thereto.

The resilient retaining ring is further provided with a plurality of longer inwardly extending tabs which are bent out of the plane thereof to define a progressively decreasing aperture from the juncture of such long tabs with the body of the resilient retaining ring to the ends of such long tabs.

With the reduced diameter cylindrical portion of the objective lens assembly housing extending through the aperture in the shutter assembly housing and the resilient retaining ring located by means of the short tabs aforesaid, the objective lens assembly may be secured to the shutter assembly housing by pressing the resilient retaining ring toward the objective lens assembly causing the long tabs to yield as the reduced diameter portion of the objective lens assembly housing passes through the resilient retaining ring. The resilient retaining ring is pushed forward until it contacts the rear face of the shutter assembly housing, thereby securing the objective lens assebmbly thereto. Because the long tabs of the resilient retaining ring are bent out of the plane thereof as aforesaid, they can accommodate movement of the reduced diameter portion of the objective lens assembly housing in only one direction. Movement in the opposite direction would tend to urge the long tabs back into the plane of the resilient retaining rings to define a progressively decreasing diameter which is prevented because the reduced diameter portion of the objective lens assembly housing extends between the long tabs.

In accordance with the foregoing, it is an object of this invention to provide an improved method and apparatus for securing an objective lens assembly to a photographic camera.

Another object of this invention is to provide an inexpensive and precise method and apparatus for securing objective lens assemblies to photographic cameras particularly when the components to be assembled are fabricated of plastic or the like.

Still a further object of the present invention is to provide an improved resilient retaining means for receiving an element and permitting such element to pass therethrough in only one direction.

BRIEF DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein.

DETAILED DESCRIPTION OF THE INVENTION

Figure 1:
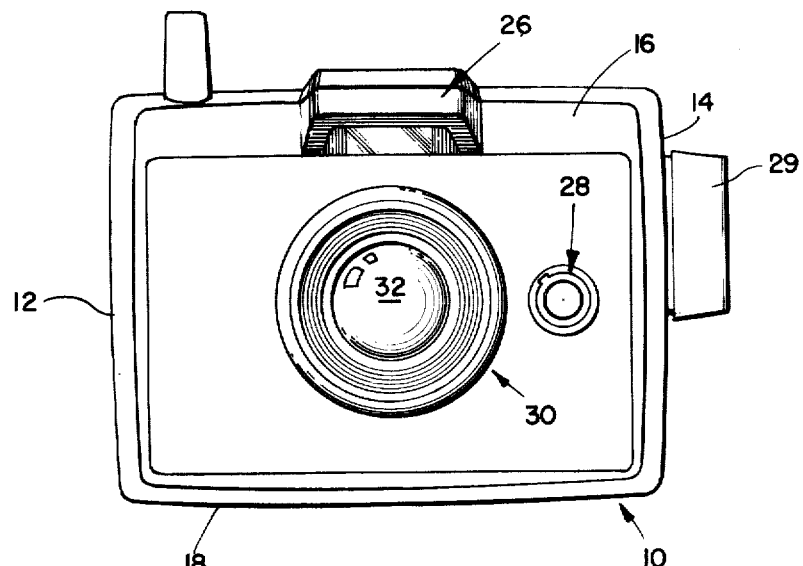
FIG. 1 provides a front elevation of the shutter housing of a typical photographic camera employing the present invention, such as the Square Shooter II camera manufactured by Polaroid Corporation of Cambridge, Mass.
Figure 4:
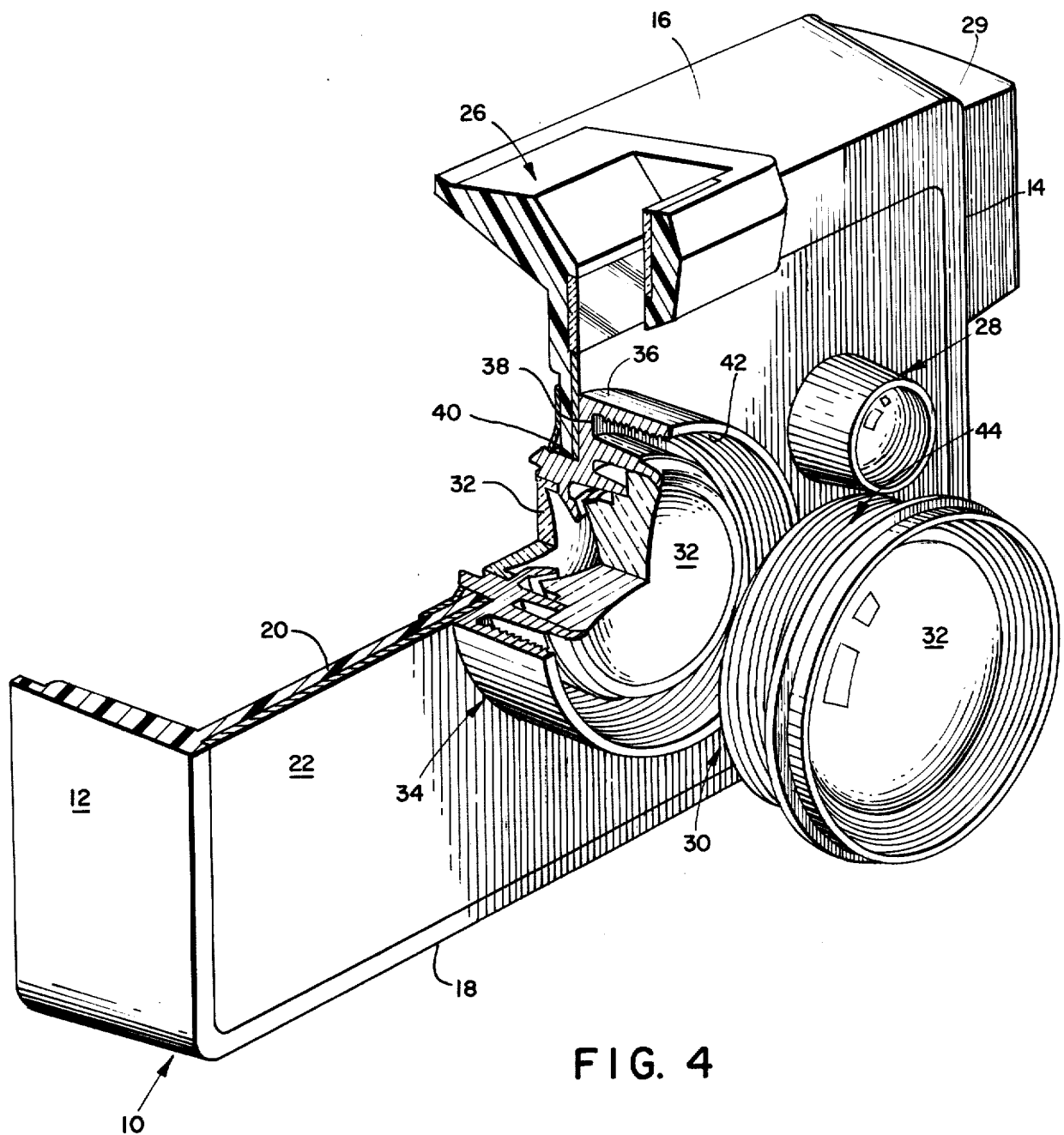
FIG. 4 provides a perspective of the shutter housing of a camera employing the subject invention partly in section.

Referring to the drawings in more detail and, more particularly to FIGS. 1 and 4, a shutter housing assembly of a Land-type photographic camera (such as the Square Shooter II manufactured by Polaroid Corporation, Cambridge, Mass.) is illustrated generally at 10. The shutter housing assembly 10 is of generally rectangular shape and is seen to comprise side wall portions 12 and 14, top and bottom wall portions 16 and 18, respectively, and front wall portion 20. The front wall portion 20 is generally rectangular and planar and includes front and rear face portions 22 and 24, respectively.

A portion of a view and rangefinder assembly is illustrated at 26, a portion of a trim control assembly is illustrated generally at 28, and a flash lamp socket assembly is shown generally at 29. Neither the view and rangefinder assembly 26 nor the trim control assembly 28 nor the socket assembly 29 form any part of the present invention and, hence, will not be further discussed herein.

a multi-component objective lens assembly is illustrated generally at 30 and, as best seen in FIG. 4, is configured to receive a plurality of lens elements 32.

Figure 3:
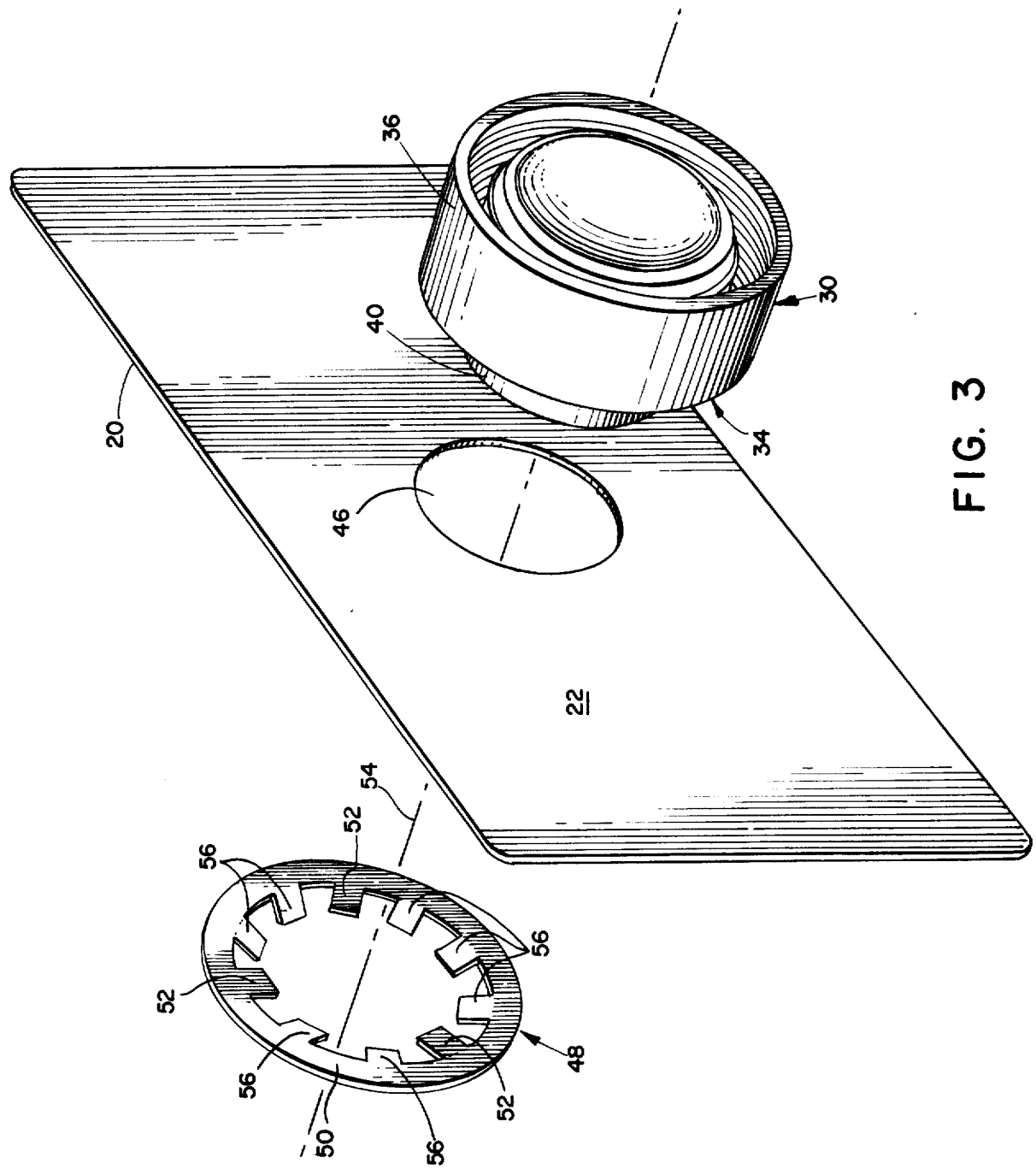
FIG. 3 provides a simplified diagrammatic assembly view of the subject invention.

As best seen in FIGS. 3 and 4, the lens assembly 30 is seen to include a housing 34 comprising a generally cylindrical front portion 36 which is connected via an annular wall portion 38 to a cylindrical rear portion 40 of a smaller diameter than that of said front portion 36 and is coaxial therewith. The front portion 36 of the housing 34 is internally threaded as at 42 (FIG. 4) so as to receive an externally threaded mount 44 for the forwardmost one of the lens elements 32 which may thereby be threadably and removably secured within the housing 34 so as to be axially movable toward and away from the front face 22, whereby the objective lens assembly 30 may be focused with respect to a particular subject. Only the forwardmost one of the lens elements 32 is movable within the housing 34 with the other lens elements 32 fixedly secured within said housing 34 in a well-known manner.

As best seen in FIG. 3, the front wall portion 20 of the shutter housing assembly 10 is provided with a centrally located aperture 46 which is of a diameter to snugly receive the cylindrical rear portion 40 of the housing 34 but of insufficient diameter to permit the cylindrical front portion 36 of said housing 34 to pass therethrough. Thus, it is seen that the housing 34 may be inserted into the aperture 46 until the annular wall portion 38 abuts the front face 22 of the front wall portion 20, and it is in this position that it is desired to secure the objective lens assembly 30 to the front wall portion 20 of the shutter housing assembly 10.

Figure 2:
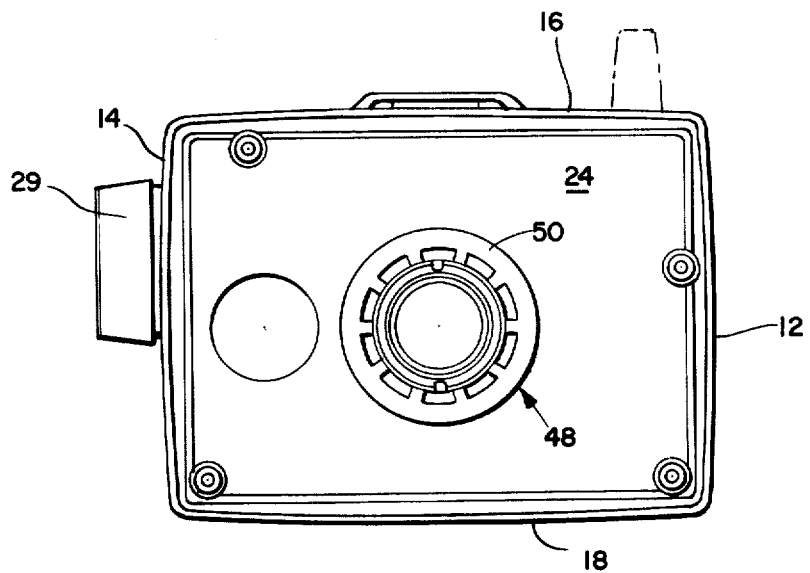
FIG. 2 provides a rear elevation of the shutter housing of FIG. 1 illustrating the resilient retaining ring of the subject invention.

As best seen in FIGS. 2 and 3, the novel resilient retaining ring of the subject invention is illustrated generally at 48 and is generally circular in shape. The retaining ring 48 includes a generally planar annular portion 50 which includes a plurality of short tab members 52 extending inwardly from the inner periphery thereof and which are symmetrically disposed about an axis 54 which is the rotational axis of symmetry of the ring 48 and is coincident with the optical axis of the lens assembly 30 and the rotational axis of symmetry of the aperture 46. It should be noted at this point that the short tab members 52 extend in the plane of the annular portion 50 of the resilient retaining ring 48. A plurality of long tab members 56 extend inwardly from the inner periphery of the annular portion 50 to a greater extent than the short tab members 52 and are bent out of the general plane of the annular portion 50 and the short tab members 52 in a direction along the rotational axis of symmetry 54. Thus, it is seen that the retaining ring 48 is so configured that the end portions of the short tab members 52 will define a fixed diameter that may be received therebetween whilst the long tab members 56 define a diameter therebetween that varies from that of the inner diameter of the annular portion 50 of the resilient retaining ring 48 to a diameter determined by the unsupported edge portions of the tab members 56 which is smaller than that determined by the tab members 52.

It is to be emphasized that the long tab members 56 are resiliently movable away from the rotational axis of symmetry 54 such that a cylindrical member of a diameter just able to pass between the tabs 52 may be urged through the retaining ring 48 between the tabs 56 in the same direction along the rotational axis of symmetry 54 that the tabs 56 are bent away from the plane of the annular portion 50.

Before proceeding, it should be noted that the component portions of the shutter housing assembly 10 such as the housing 34 are typically constructed of plastic material and that it is desired to be able to secure the objective lens assembly 30 to the shutter housing assembly 10 with a minimum of effort and without attendant damage to the housing 34. Accordingly, the resilient retaining ring 48 may typically comprise a unitary structure such as steel having a relatively low yield strength, e.g., under 100,000 psi.

In order to fixedly secure the lens assembly 30 to the shutter housing assembly 10 it is simply necessary to press the lens assembly 30 into the aperture 46 (with the cylindrical rear portion 40 foremost) until the annular wall portion 38 of the housing 34 abuts the front face 22 of the front wall portion 20. While the housing 34 remains urged into abutment with the front wall portion 20 of the shutter housing assembly 10, the retaining ring 48 may be pressed over the cylindrical rear portion 40 of the housing 34 which extends into the shutter housing assembly 10 beyond the rear face 24. The retaining ring 48 is first placed over the edge of the cylindrical rear portion 40 and is located with respect thereto by the short tab members 52 such that the rotational axis of symmetry of the retaining ring 48 is coincident with the optical axis of the objective lens assembly 30. In this initial position, the edges of the short tab members 52 will abut the surface of the cylindrical rear portion 40 whilst the end of the cylindrical rear portion 40 will abut the face portions of the long tab members 56. It will be recalled that the long tab members 56 extend inwardly to define a smaller diameter than that defined by the short tab members 52 and, hence, will not initially permit the cylindrical rear portion 40 of the housing 34 to pass therebetween. If at this time sufficient force is applied to the annular portion 50 of the resilient retaining ring 48 urging same toward the inner face 24 of the front wall portion 20, the long tab members 56 will be caused to resiliently move away from the rotational axis of symmetry 54 by the cylindrical end portion 40 so as to permit the resilient retaining ring to move into abutment with the rear face 24, as best seen in FIG. 2. At this time, the objective lens assembly 30 will be fixedly secured to the shutter housing assembly 10 because any movement of the objective lens assembly 30 outward of the front face 22 would cause the long tab members 56 to be urged toward the rotational axis of symmetry 54 so as to define a smaller diameter. Stated more simply, and force tending to urge the objective lens assembly 30 to move outward of the front face 22 of the shutter housing assembly 10 would cause the grip exerted by the retaining ring 48 on the cylindrical end portion 40, via the long tab members 56, to increase so as to prevent the withdrawal of the housing 34 from the aperture 46.

While the novel resilient retaining method and apparatus of the subject invention have been described with respect to the securing of an objective lens assembly to the shutter housing of a photographic camera, it should be clear that the method and apparatus herein depicted has utility outside of the field of photography as in any application wherein it is desired to secure a body to an apertured plate.

Accordingly, it can readily be seen that many variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. A method of assembling at least first and second components, said first component being provided with a first aperture, with a retaining member, said retaining member having a planar peripheral portion and a plurality of coplanar first tabs defining a second aperture and a plurality of second tabs resiliently connected to said peripheral portion and extending in a direction away from the plane of said peripheral portion comprising the steps of:
   inserting said second component at least partly through said first aperture in said first component;
   inserting said second component through said second aperture in contact with at least one of said first tabs to locate said retaining member with respect to said second component;
   further inserting said second component through said second aperture and into engagement with said second tabs whereby said second tab members are caused to resiliently move away from said plane and admit said second member therebetween so as to prevent the withdrawal thereof; and
   bringing said retaining member into abutment with said first component.

2. A method of assembling at least a first component having a first aperture and a second component with a retaining member having a planar peripheral portion and a plurality of coplanar first tabs defining a second aperture and a plurality of second tabs resiliently connected to said peripheral portion and extending in a direction away from the plane of said peripheral portion comprising the steps of:
   engaging said retaining member and said first component with said first and second apertures in registry;
   inserting said second component through said first and second apertures in contact with at least one of said first tabs to locate said retaining member with respect to said second component; and
   further inserting said second component through said first and second apertures and into engagement with said second tabs whereby said second tab members are caused to resiliently move away from said plane and admit said second member therebetween so as to prevent the withdrawal thereof.

3. In combination with a photographic camera of the type including a shutter housing having a generally planar forward wall portion with a first circular aperture therethrough, means for securing a photographic objective lens assembly to said housing, including:
   a lens housing assembly having at least one lens element secured therewithin, said housing assembly having a first cylindrical portion having a diameter slightly smaller than said first aperture whereby said first portion may snugly pass through said first aperture, said first portion extending through said first aperture, said housing assembly having a second cylindrical portion having a diameter larger than said aperture so that it cannot pass therethrough in abutment with said wall portion; and
   a retaining member of a dimension unable to pass through said aperture and having means defining a variable aperture therethrough, positioned over said first portion in abutment with the opposite side of said wall portion from said second portion; said variable aperture defining means engaging and gripping said first portion such that any force tending to move said second portion out of abutment with said wall portion will cause said aperture defining means to exert an increased grip on said first portion to secure said lens housing to said shutter housing, said retaining member comprising a generally planar ring having a rotational axis of symmetry, said retaining member including locating means for registering said retaining member with respect to said first portion to facilitate the positioning of said retaining member over said first portion, said locating means comprising a plurality of first tab members extending inwardly to define a circular aperture of diameter slightly larger than that of said first portion, and said variable aperture defining means including a plurality of inwardly extending second tab members extending out of the plane of said ring in a direction toward and along said rotational axis of symmetry.

4. The invention as stated in claim 3, wherein said first tab members are coplanar with said ring and said second tab members are longer than said first tab members.

5. The invention of claim 4, wherein said second tab members extend resiliently from said ring whereby they will be pushed outward in response to the pressing of said retaining member onto said first portion to define an aperture sufficient to receive said first portion.

6. The invention as described in claim 5, wherein said lens housing assembly is plastic and said retaining member comprises a monolithic steel member having a yield strength less than 100,000 psi.

7. Apparatus for securing an objective lens assembly to the shutter housing of a photographic camera, said shutter housing including a forward wall portion having an aperture therethrough and said lens assembly including a housing having a first portion of a dimension insertable through said aperture and a second portion of a dimension unable to pass through said aperture, said apparatus including:
   a resilient retaining member of a dimension unable to pass through said aperture comprising a generally planar ring having a rotational axis of symmetry and having means defining a variable aperture therethrough, including a plurality of radially inward extending second tab members extending out of the plane of said ring in a direction along said rotational axis of symmetry, whereby said member may be positioned over said first portion in abutment with the opposite side of said wall portion from said second portion when said first portion is inserted through said aperture; said variable aperture defining means engaging and gripping said first portion such that any force tending to move said lens assembly away from said wall portion will cause said aperture defining means to exert an increased grip on said first portion thereby securing said lens assembly to said shutter housing, said retaining member further including locating means comprising a plurality of first tab members extending radially inward to define a circular aperture of a diameter smaller than said dimension of said first portion for registering said retaining member with respect to said first portion to facilitate the positioning of said retaining member over said first portion.

8. The invention as described in claim 7, wherein said first tab members are coplanar with said ring and said second tab members are longer than said first tab members.

9. The invention as set forth in claim 8, wherein said second tab members extend resiliently from said ring to initially define an aperture of a dimension insufficient to receive said first portion whereby said second tab members may be pushed outward in response to the pressing of said retaining member onto said first portion to define an aperture sufficient to receive said first portion.

10. The invention as described in claim 9, wherein said lens housing assembly is plastic and said retaining member comprises a monolithic steel member having a yield strength less than 100,000 psi.

* * * * *